United States Patent [19]
Crosby

[11] Patent Number: 5,929,718
[45] Date of Patent: Jul. 27, 1999

[54] APPARATUS AND METHOD FOR TRANSMITTING ELECTRICAL POWER AND BROADBAND RF COMMUNICATIONS SIGNALS THROUGH A DIELECTRIC

[75] Inventor: John B. Crosby, Yorba Linda, Calif.

[73] Assignee: Multiplex Technology, Inc., Brea, Calif.

[21] Appl. No.: 08/818,888

[22] Filed: Mar. 17, 1997

Related U.S. Application Data

[63] Continuation-in-part of application No. 08/610,327, Mar. 4, 1996, Pat. No. 5,612,652.

[51] Int. Cl.$^6$ ....................................................... H01P 5/00
[52] U.S. Cl. ........................... 333/24 R; 333/25; 343/850
[58] Field of Search ..................................... 333/25, 24 R, 333/24 C; 343/713, 715, 850

[56] References Cited

U.S. PATENT DOCUMENTS

| | | | |
|---|---|---|---|
| 4,109,214 | 8/1978 | Main | 333/25 |
| 4,238,199 | 12/1980 | Parfitt | 343/715 |
| 4,764,773 | 8/1988 | Larsen et al. | 343/713 |
| 4,794,319 | 12/1988 | Shimazaki | 343/175 |
| 4,825,217 | 4/1989 | Choi | 343/715 |
| 4,916,456 | 4/1990 | Shyu | 343/713 |
| 5,057,847 | 10/1991 | Vaisanen | 343/702 |
| 5,105,201 | 4/1992 | Nakase et al. | 343/715 |
| 5,134,486 | 7/1992 | Suzuki et al. | 358/190 |
| 5,161,255 | 11/1992 | Tsuchiya | 455/345 |
| 5,212,492 | 5/1993 | Jesman et al. | 343/713 |
| 5,278,572 | 1/1994 | Harada et al. | 343/715 |
| 5,298,907 | 3/1994 | Klein | 343/715 |
| 5,422,681 | 6/1995 | Hyashi | 348/730 |
| 5,451,966 | 9/1995 | Du et al. | 343/715 |
| 5,557,290 | 9/1996 | Watanabe | 343/713 |
| 5,612,652 | 3/1997 | Crosby | 343/713 X |

*Primary Examiner*—Seungsook Ham
*Attorney, Agent, or Firm*—Lynn & Lynn

[57] ABSTRACT

An interface device permits installation of a video system by direction broadband RF signals from an outdoors transmission line to an indoors receiver and by providing electrical power from the receiver to the transmission line for the antenna electronics without requiring a hole for passage of a coaxial cable. Power transmission circuitry includes a first inductor mounted adjacent the first side of a window and connected to the first transmission line to receive DC electrical power therefrom. A square wave drive signal is applied to switch apparatus that converts the DC power received by the inductor into time-varying electrical signals that produce a time-varying magnetic field. A second inductor that is part of a resonant circuit mounted adjacent the dielectric layer opposite the first inductor receives the transmitted power via magnetic induction. A rectifier circuit connected between the second inductor and the second transmission line converts electrical power output therefrom into DC electrical power and supplies the DC electrical power to the second transmission line. A feedback circuit maintains the frequency of the drive signal at the value for maximum power transfer. The RF signal transmission circuitry includes apparatus connected to the second transmission line to receive broadband RF signals therefrom and produce a pair of differentially balanced feed signals. The feed signals are capacitively coupled across window glass and fed into a coaxial cable for transmission to the receiver.

26 Claims, 5 Drawing Sheets

5,929,718

APPARATUS AND METHOD FOR TRANSMITTING ELECTRICAL POWER AND BROADBAND RF COMMUNICATIONS SIGNALS THROUGH A DIELECTRIC

CROSS REFERENCE TO RELATED APPLICATION

This is a continuation-in-part of application Ser. No. 08/610,327, filed Mar. 4, 1996.

BACKGROUND OF THE INVENTION

This invention relates generally to transmission of broadband RF communications signals and DC electrical power through a dielectric such as glass. More particularly, this invention relates to transmission of video signals from satellite antenna electronics through a glass window into a structure such as a home, office building or other structure and transmission of driving power from inside the building through the glass to the antenna electronics.

The prior art includes several systems for transmitting single frequency or narrow band RF signals from a mobile telephone antenna through an automobile glass window. Some mobile telephone systems use capacitor plates formed on opposite sides of the glass to transmit the antenna output to a receiver. Other mobile telephone systems use a first slot antenna to radiate the telephone signals across the glass and a second slot antenna to receive the signals and direct them to the receiver. A mobile telephone system is designed to operate at a particular carrier frequency.

Satellite TV systems provide video signals from electronics associated with the antenna to a receiver that is typically located in structure such as a residence, office building or a motor vehicle. The video signals are carried by 75 Ω coaxial cable. Electrical power for the satellite electronics is provided from the receiver on the same coaxial cable. Installation of a satellite TV system thus requires the delivery of RF signals from the antenna electronics outside the building to a receiver inside the building and the delivery of electrical power from the receiver to the antenna electronics. Typical installations require drilling a hole through a wall or window frame to provide a passage for the coaxial cable.

In many cases drilling a hole through a wall of a structure is undesirable. Many home owners do not want holes drilled through their walls. In rental residential or commercial property drilling a hole through a wall may be impermissible. In many cases drilling a hole in a wall of a motor vehicle is unacceptable to the owner or user of the vehicle.

The mobile telephone systems, being single frequency or narrow band cannot be adapted for video signals, which cover a frequency range of about 900 MHz to 1500 MHz. The mobile telephone systems are directed to connecting a receiver and an antenna without regard to potential common mode interference problems that arise from other interfering sources. In a satellite TV system the problem is electrically coupling the receiver and a transmission line, which is connected to the output of the electronics, typically a downconverter, that the antenna manufacturer has included with the dish antenna. The mobile telephone systems also do not provide power from the receiver to electronics that are outside the vehicle.

Therefore, there is a need in the art for a system for installing a satellite TV system without drilling a hole through the structure where the satellite TV system is being installed.

SUMMARY OF THE INVENTION

Accordingly, the present invention provides a system that overcomes the deficiencies of prior art techniques for installing video systems to direct broadband RF signals from an external transmission line to an indoors receiver and provide electrical power from the receiver to the transmission line for the antenna electronics. The present invention includes RF circuitry that provides an essentially flat broadband response for frequencies between 900 MHz and 1500 MHz. The prior art telephone circuits that transmit RF signals through glass are parallel connections of narrow band circuits that fail to provide a flat frequency response.

An interface circuit according to the invention for transmitting electrical signals between a first transmission line that is connected to a receiver on a first side of a dielectric layer and a second transmission line that is connected to antenna electronics on a second side of the dielectric layer comprises power transmission circuitry and RF signal transmission circuitry The power transmission circuitry includes a first inductor mounted adjacent the first side of the dielectric layer and connected to the first transmission line to receive DC electrical power therefrom and a switch connected to the inductor. Drive circuitry is connected to the switch to convert the DC power received by the inductor into time-varying electrical signals that produce a time-varying magnetic field. A second inductor is mounted adjacent the dielectric layer opposite the first inductor within the time-varying magnetic field of the first inductor and is part of a resonant circuit. Electrical power is transmitted through the dielectric layer via magnetic induction from the first inductor to the second inductor. A rectifier circuit is connected between the second inductor and the second transmission line to convert electrical power output therefrom into DC electrical power and supply the DC electrical power to the second transmission line.

The power transmission circuit preferably includes a feedback circuit arranged to maintain the drive frequency of the drive to the switch at the resonant frequency of the reactive power transfer circuit to provide maximum power transfer.

The RF signal transmission circuitry includes apparatus connected to the second transmission line to receive broadband RF signals therefrom and produce a pair of differentially balanced feed signals. The differentially balanced feed provides common mode rejection. Two opposing pairs of plates are mounted adjacent the two sides of the dielectric layer. The pairs of plates are arranged to conduct the RF signals from the second transmission line across the dielectric layer. Circuitry is connected between the plates mounted on the other side of the dielectric to convert the differentially balanced feed into an unbalanced feed that is input to the first transmission line.

DETAILED DESCRIPTION OF THE PREFERRED EMBODIMENT

Figure 1:
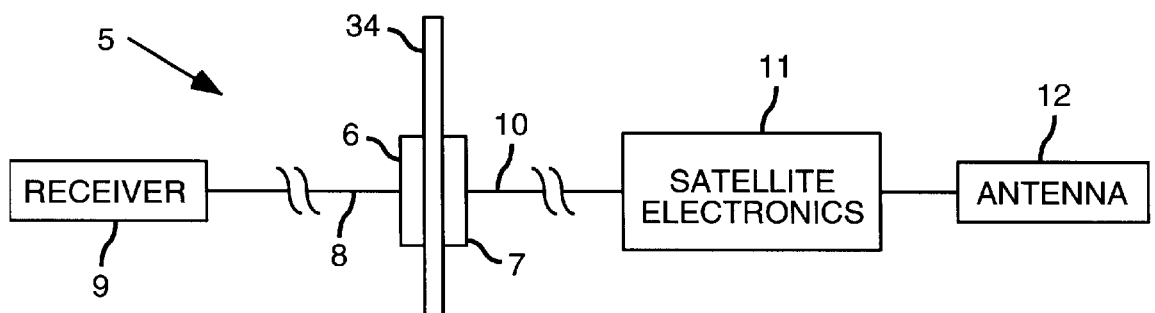
FIG. 1 is a generalized block diagram of the invention.
Figure 4:
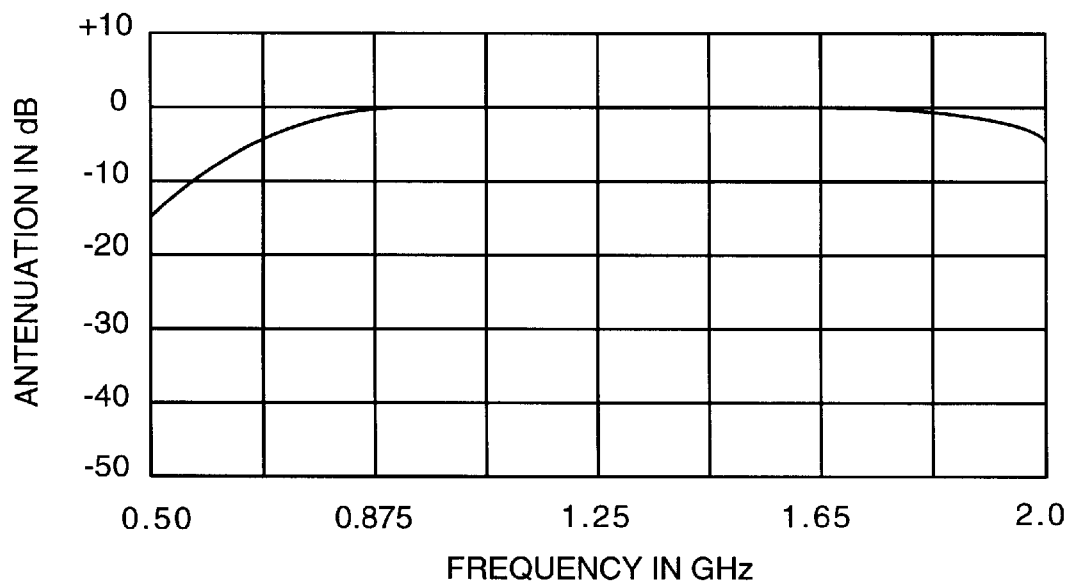
FIG. 4 graphically illustrates the amplitude of the RF signals transmitted from the external transmission line to the interior receiver.

Referring to FIG. 1, an interface device 5 according to the invention has an indoors circuit 6 mounted to the interior surface of a window 34. The window 34 may be a single thickness of glass or it may comprise two or more layers of glass, air or other dielectric material.

An outdoors circuit 7 of the interface device 5 is mounted to the exterior surface of the window 34 in predetermined alignment with the indoors circuit 6. A transmission line 8 is connected between the indoors circuit 6 and a receiver 9, which is connected to a power source (not shown). A transmission line 10 is connected between the outdoors circuit 7 and a satellite electronics unit 11, which is connected to an antenna 12 that is suitable for receiving video signals from a communications satellite (not shown) orbiting the earth. The interface device 5 is formed to provide DC power from the receiver 9 and to provide broadband RF signals from the transmission line 10 to the receiver 9. The transmission line 10 is exposed to radiation from sources (not shown) other than the antenna 12 and therefore conducts unwanted common mode signals to the outdoors circuit 7. The interface circuit also provides rejection of common mode signals from these sources.

The problem solved by the present invention is providing RF signals from the outdoors transmission line 10 to the indoors transmission line 8 that is connected to the receiver 9 and providing electrical power from the indoors receiver 9 to the outdoors transmission line 10 for delivery to the satellite electronics 11. The outdoors portion 7 of the interface circuitry 5 according to the invention transmits broadband RF signals from the outdoors transmission line 10 through a window glass 34 to an indoors portion 6 of the interface circuit 5. The indoors portion 6 of the interface circuit 5 is connected to a transmission line 8 that is connected to the indoors receiver 9. The indoors portion 6 of the interface circuit transmits electrical power from the indoors receiver 9 to the outdoors portion 7 of the interface circuit 5. The outdoors portion 7 of the interface circuitry 5 provides the electrical power to the outdoors transmission line 10, which then conducts the DC power to the satellite electronics 11.

FIGS. 2–7 illustrate the principles of the present invention by showing specific interface circuitry for implementing the invention.

Electrical Power Transmission system

Conventional TV satellite systems require a power source capable of being switched between 12 VDC or 18 VDC. Signals from the satellite are divided into vertically polarized and horizontally polarized. The voltage provided to the satellite electronics determines whether signals carried by the vertical or horizontal polarization are to be sent to the receiver. The electrical power transmission according to the invention meets the power requirements of conventional TV satellite systems.

Figure 2:
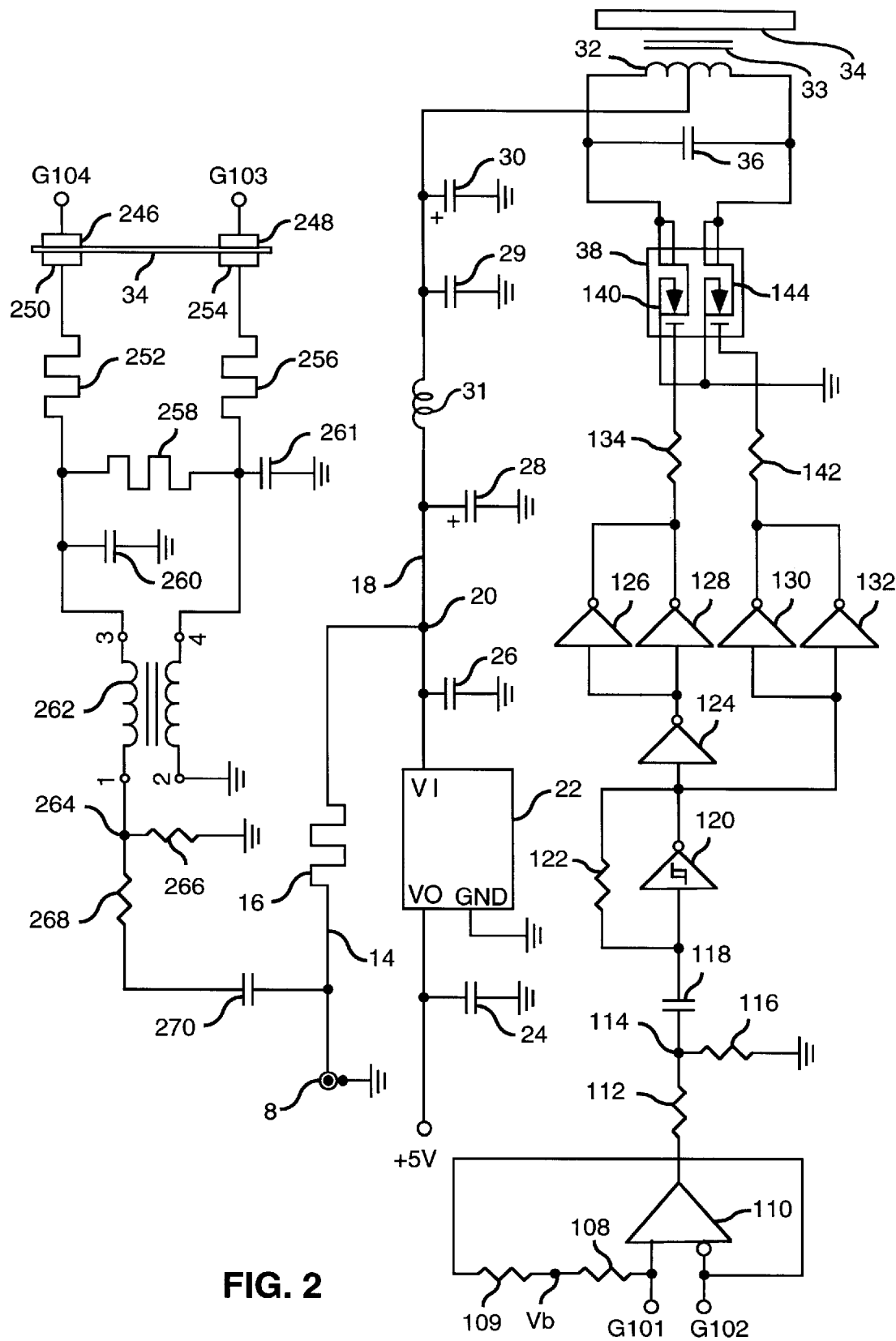
FIG. 2 is a schematic diagram of circuitry according to the invention that is located on the interior side of a window for transmitting electrical power to an external transmission line and for receiving video signals from the transmission line.

Referring to FIG. 2, the indoors interface section includes an electrical conductor 14 that is connected to the coaxial cable 8. The coaxial cable 8 is arranged to receive DC electrical power from the receiver 9 of FIG. 1. The DC electrical power from the receiver 9 provides power for the interface circuitry described subsequently and for the outdoors satellite electronics 11, which is also shown in FIG. 1. The electrical power then flows from the coaxial cable 8 through the conductor 14 to an inductor 16. The inductor 16 blocks RF signals from entering subsequent components of the power transmission circuitry. The inductor 16 is connected to a conductor 18 at a junction 20.

Figure 3:
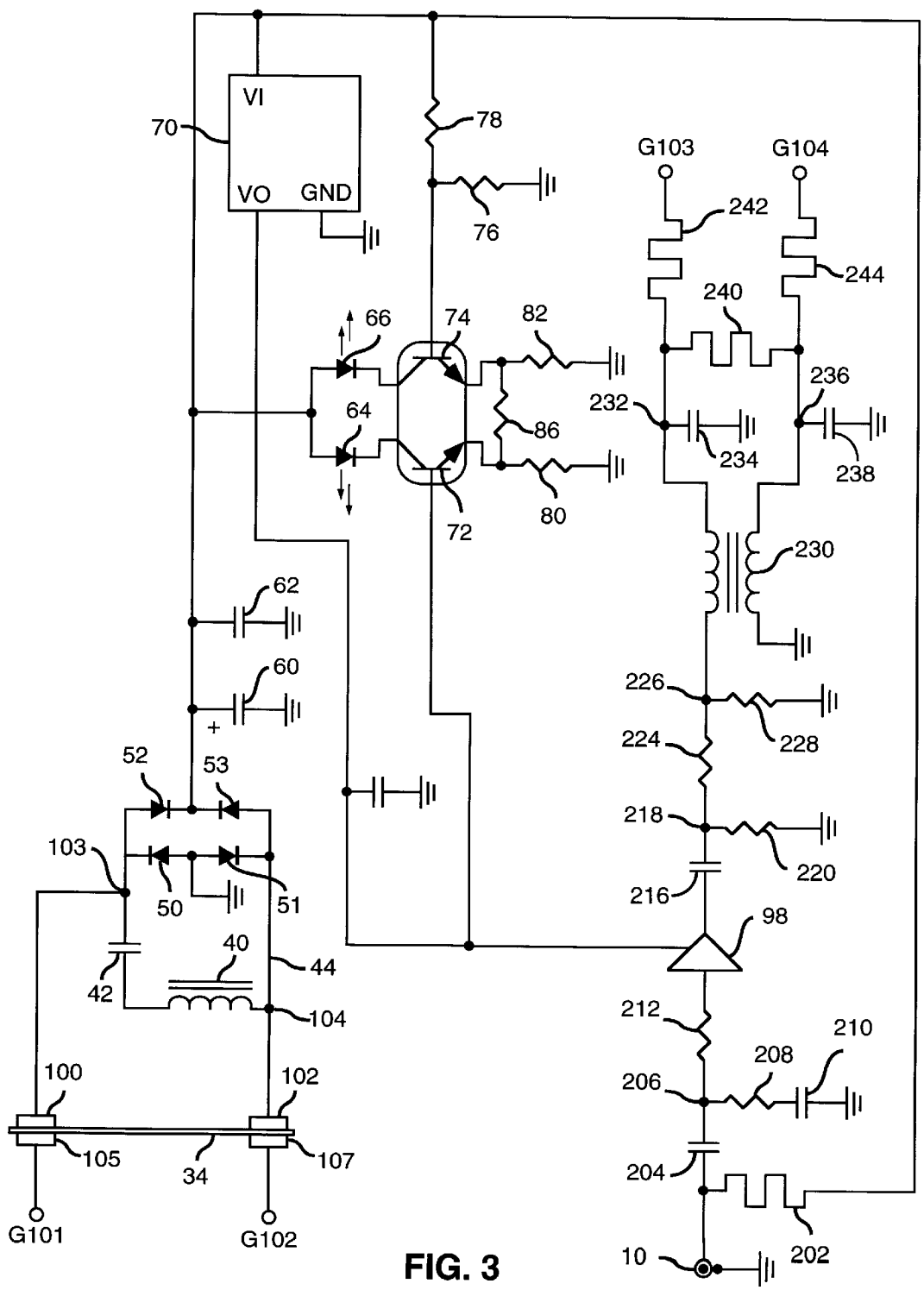
FIG. 3 is a schematic diagram of circuitry according to the invention that is located on the exterior side of a window for receiving electrical power for delivery to an external transmission line and for sending video signals from the transmission line to the circuitry of FIG. 2.

The indoors interface circuit section 6 preferably is formed on a printed circuit board (not shown). It is convenient to form inductors having small inductances as lengths of a conductor on the printed circuit board. The inductor 16 preferably has an inductance of about 20 nH and may be achieved by forming parallel sections of conductor on the printed circuit board. In FIGS. 2 and 3, printed circuit inductors are shown in the manner illustrated for the inductor 16. Wound conductor inductors are illustrated in the conventional manner.

A voltage regulator 22 is connected between the junction 20 and a +5 volt DC source. A capacitor 26 is connected between the input of the voltage regulator 22 and ground to prevent AC noise from entering the voltage regulator 22. The capacitor 26 preferably has a capacitance of about 0.1 mF. The output of the voltage regulator 22 is connected to a capacitor 24, which also bypasses any AC noise in the output of the voltage regulator 22 to ground.

A filter network that includes capacitors 28–30 and an inductor 31 prevents switching transients from being coupled back to coaxial cable 8. The capacitors 28 and 30 preferably each have a capacitance of about 3.3 mF, and the capacitor 29 preferably has a capacitance of about 0.1 mF. The inductor 31 preferably has an inductance of about 1 mH.

The filtered DC power is then conducted to a tapped inductor 32, which has a movable core 33. The inductor 32 is placed adjacent to the window 34. The ends of the inductor 32 are connected to a capacitor 36 so that the inductor 32 and the capacitor 36 are in parallel. The capacitor 36 preferably has a capacitance of about 1000 pF. The parallel combination of the inductor 32 and capacitor 36 is connected to a MOSFET device 38 that converts the DC power input to the inductor 32 into an alternating magnetic field, which is then used to transmit the power across the gap created by the thickness of the glass 34 via magnetic induction.

The exterior portion of the interface circuitry shown in FIG. 3 includes an inductor 40 that is mounted adjacent the window glass 34. It should be noted that the window glass 34 remains intact with no holes or grooves being formed therein. The time-varying magnetic field produced by the inductor 32 extends axially away from the coil that forms the inductor 32. In particular, the magnetic field produced by the inductor 32 extends to the region occupied by the inductor 40. The time-varying magnetic field produced by the inductor 32 induces a current in the inductor 40.

The power transmission circuitry sends power across the dielectric gap to the transmission line 10 that is in turn connected to the electronics 11 for the antenna 12. Because of the dielectric gap, there is no continuous core for linking magnetic flux created in the primary inductor 32 to the inductor 40. Also because of inherent satellite system limitations in the power available, the coupling efficiency preferably is at least 60%. The circuitry in the power transmission system described subsequently describes how this efficiency is achieved at a level of approximately 4 watts across the glass gap.

A capacitor 42 is connected to a first end of the inductor 40. The other end of the inductor 40 is connected to a conductor 44. The capacitor 42 preferably has a capacitance of about 10000 pF. A diode network that includes diodes 50–53 is connected across the series connected inductor 40 and capacitor 42. The output of the diode network is then filtered by a pair of capacitors 60 and 62 that preferably have capacitances of about 4.7 mF and 0.1 mF, respectively.

The DC power from the diode array is delivered to a voltage regulator 70, which provides a regulated 5 VDC output. The output of the voltage regulator 70 is input to a voltage level indicator that includes pair of transistors 72 and 74 that are arranged to form a comparator and a pair of light emitting diodes (LEDs) 64 and 66. The comparator is arranged to compare the voltage output from the diode array with the 5 VDC regulator output. A resistor 76 that preferably has a resistance of about 51 kΩ is connected between the base of the transistor 74 and ground. A resistor 78 is connected between the base of the transistor 74 and the input of the voltage regulator 70. The resistors 76 and 78 set the comparison levels of the transistors 72 and 74. The resistors 76 and 78 provide a voltage division of 3:1 so that when the output voltage from the power transfer circuit is 15 volts, the same voltage is applied to both transistors 72 and 74. The comparator includes resistors 80 and 82 connected between the emitters of the transistors 72 and 74 and ground. A resistor 86 is connected between the emitters. The resistor 80 and 82 preferably each have resistance's of about 2 kΩ. The resistor 86 preferably has a resistance of about 100 Ω. When the applied voltage is 15 volts, both LEDs have the same brightness. When the applied voltage is lower than 15 volts the LED 64 is brighter than the other. When the applied voltage is higher than 15 volts, the LED 66 is the brighter of the two LEDs.

The inductor core 33 position is preset for a standard glass pane thickness, and ordinarily no adjustment of the core position is necessary. However, when the system is installed on the window 34, the installer may adjust the position of the core 33 of the inductor 32 so that the LEDs 64 and 66 brighten as desired to indicate the voltage. The LED 64 may be formed to emit a bright green light when the system is in the 12 volt DC mode, which corresponds to either vertical or horizontal polarized signals from the satellite. Similarly, the LED 66 may emit a bright yellow light when the system is in the 18 volt DC mode, which corresponds to the other polarization.

The output of the voltage regulator 70 is also provides a bias voltage to an amplifier 98 that is included in the RF signal transmission circuitry.

Referring still to FIGS. 1 and 3, the electrical connection between the antenna electronics 11 and the interface circuitry preferably is provided by a coaxial cable 10 as ordinarily used in such applications. An inductor 202 that preferably has an inductance of about 20 nH is connected between the coaxial cable 10 and the voltage regulator 70 to provide a conducting path for the DC power that is delivered to the transmission line and then to the antenna electronics.

Achieving the required power transmission level through the glass 34 normally requires the drive signal to operate at the resonant frequency which is dictated by inductor 40 and capacitor 42. The resonant frequency is the frequency of maximum power transfer. The system is preferably constructed to operate at a resonant frequency of about 60 kHz. However, the thickness of the glass, temperature fluctuations, component aging and other environmental factors can cause the resonant frequency to deviate from the nominal 60 kHz value. To maintain the frequency in the inductors 32 and 40 at the resonant frequency, the invention includes a feedback network to control the frequency into which the DC power is converted for input to the inductor 32 and transmission across the gap via magnetic induction.

Still referring to FIG. 3, this feedback network includes a capacitive plate 100 connected to the capacitor 42 at a junction 103 and a capacitive plate 102 is connected to the inductor 40 at a junction 104. A plate 105 is mounted adjacent the glass 34 opposite the plate 100, and a similar plate 107 is mounted to the glass 34 opposite the plate 102. The pairs of plates 100, 105 and 102, 107 are arranged to provide a capacitive coupling across the dielectric glass 34. The capacitive coupling using the two sets of plates provides a differentially balanced drive via terminals G101 and G102 to avoid sending back stray common mode noise signals to the feedback network.

The signals at the terminals G101 and G102 are input to an amplifier 110 shown in FIG. 2. The amplifier 110 has a bias voltage source Vb connected to resistors 108 and 109 that are connected to the amplifier inputs G101 and G102, respectively.

Signals input at the terminal G102 are inverted with respect to G101. The feedback circuitry may include a voltage divider (not shown) to scale the feedback signal to an amplitude appropriate for input to the amplifier 110. When the power transfer circuit is operating, the voltages at G101 and G102 are of equal magnitude and are 180° out of phase. Should the frequency deviate from resonance, a phase difference develops between the drive of inductor 32 and the feedback from G101 and G102. The amplifier 110 is preferably a linear amplifier with differential input so that only feedback signals from the capacitors 100 and 102 are amplified.

The differential inputs to the linear amplifier and resulting reinforcement of those in-phase signals at the resonant frequency forms a circuit that oscillates at the resonant frequency of the reactive power transfer circuit. Even if the resonant frequency has deviated from its nominal 60 kHz value, the oscillator tracks the actual resonant frequency. The phase response of the feedback signal to the amplifier at the differential inputs insures that oscillation will occur only at the actual resonant frequency even if it varies with temperature and other environmental parameters.

The amplifier 110 and subsequent drive circuitry should be very fast in order for the signal amplified to be free of phase errors at the resonance frequency at all times. The time delay between the input and output for the amplifier 110 preferably is 200 nanoseconds or less. The maximum resulting phase error is then less than 5°.

The output of the amplifier 110 is input to a resistor 112 that preferably has a resistance of about 2 kΩ. The signal input to the resistor 112 is a rectangular wave that is an analog representation of the signal output by the inductor 40 and capacitor 42 to the load connected thereto. A resistor 116, which preferably has a resistance of about 2 kΩ has one end connected to the resistor 112 at a junction 114. The other end of the resistor 116 is grounded.

When power is first applied to the interface circuit, there is no feedback signal and therefore no oscillatory input to the MOSFET circuitry 38. Absent a suitable signal input to the MOSFET circuitry 38, the power transfer circuitry will not function to convert the DC input to time-varying signals that can be transmitted from the inductor 32 to the inductor 40 via magnetic induction.

Therefore, the drive network includes a Schmitt trigger circuit 120 that is connected to the junction 114 through a capacitor 118 that preferably has a capacitance of about 470 pF. A resistor 122 preferably having a resistance of about 51 kΩ is connected across the input and output of the Schmitt trigger circuit 120. The capacitance 118 and the resistor 122 cooperate to cause the Schmitt trigger 120 to self-oscillate and produce a square wave at a frequency of about 60 kHz in the absence of a signal output from the amplifier 110. The 60 kHz output of the Schmitt trigger 120 then is input to an inverter 124 whose output is connected to the input terminals of a pair of parallel-connected inverters 126 and 128. The output of the Schmitt trigger 120 is also input directly to the input terminals of a second pair of parallel-connected inverters 130 and 132.

The output signal from the inverters 126 and 128 is input to a resistor 134 that preferably has a resistance of about 10 Ω. Signals that pass through the resistor 134 are input to a first MOSFET 140 in the MOSFET device 38. The output signal from the inverters 130 and 132 is input to a resistor 142 that preferably has a resistance of about 10 Ω. Signals that pass through the resistor 142 are input to a second MOSFET 144 in the MOSFET device 38.

The inverters 124, 126, 128, 130 and 132 drive the MOSFETs 140 and 144 so that they are 180° out of phase. Therefore, the MOSFETs 140 and 144 form an electronic switch that alternately produces outputs of low and high resistance to ground. One MOSFET output is grounded while the other is open. The DC power is applied to the center tap of the inductor 32 while its opposite ends alternate between ground potential and approximately twice the supply voltage to the center tap of inductor 32. Therefore, current through the inductor 32 varies with time, which allows transmission of power through the glass 34 via magnetic induction.

The driver input signal from the Schmitt trigger 120 at start up turns the switches 140 and 144 on and off so that the MOSFETs convert the DC signal applied to the center tap of the inductor 32 into a 60 kHz square wave. Just after start up, the feedback signal is applied to the amplifier 110, the output of which is then used to phase lock the Schmitt trigger so that it produces an output that has the same frequency and phase as the signal output from the amplifier 110.

RF Transmission system

Referring to FIG. 3, the RF signal from the antenna electronics (not shown) is guided by the coaxial cable 10 as ordinarily used in such applications to the exterior portion of the interface circuit according to the invention. A capacitor 204 that preferably has a capacitance of about 100 pF is connected to the coaxial cable 10 for coupling the RF signals from the coaxial cable 10 into the interface circuit.

A resistor 212 that preferably has a resistance of about 20 Ω is connected to the capacitor 204 at a junction 206 and to the input of the amplifier 98. A resistor 208 that preferably has a resistance of about 82 Ω is connected between the junction 206 and a first terminal of a capacitor 210 that preferably has a capacitance of about 0.1 mF. The other terminal of the capacitor 210 is grounded. The resistors 208 and 212 are matching resistors that match the impedance of the amplifier 98 to the coaxial cable 10. The amplifier 98 preferably has input and output impedances of 50 Ω. The capacitor RF output of the amplifier 98 passes through a capacitor 216 that preferably has a capacitance of about 100 pF.

A resistor 224 that preferably has a resistance of about 20 Ω is connected to the capacitor 216 at a junction 218. A resistor 220 that preferably has a resistance of about 300 Ω is connected between the junction 218 and ground. Another resistor 228 that preferably has a resistance of about 300 Ω has a first end connected to a junction 226 that is connected the output of the resistor 224. The other end of the resistor 228 is grounded. The three resistors 220, 224 and 228 together form a π-attenuator that isolates the effects of resonances and reactive loads on the amplifier 98.

The RF signals next enter a balun 230 that converts the unbalanced feed from the amplifier 98 into a differentially balanced feed. The present invention is designed to guide RF signals from the coaxial cable 10 to the receiver 9 while suppressing unwanted common mode signals that may be picked up from radiation sources other than the antenna 12. The coaxial cable 10 is typically a long cable that can act like an antenna that picks up unwanted signals. The differentially balanced output of the balun 230 is applied across an inductor 240 that preferably has an inductance of about 12 nH. The circuit includes grounded capacitors 234 and 238 connected to the opposite ends of the inductor 240. These capacitors may be formed as physical structures on the printed circuit board. The differentially balanced feed provides maximum rejection of common mode signals.

An inductor 242 has one terminal connected to the junction of a first terminal of the balun 230, the capacitor 234 and the inductor 240. The other terminal of the inductor 242 is connected to a plate 246 that is located adjacent to the window glass 34. Similarly, an inductor 244 has one terminal connected to the other output of the balun, the capacitor 238 and the inductor 240. The other terminal of the inductor 244 is connected to a plate 248 that is also located adjacent the window glass.

Referring to FIG. 2, plates 250 and 254 are located adjacent the window glass opposite the plates 246 and 248, respectively. The opposing pairs of plates 246, 250 and 248, 254 form capacitors that couple the differentially balanced RF signals through the glass 34. RF signals from the plate 250 pass through an inductor 252 that preferably has an inductance of about 4.5 nH to a first input terminal of a balun 262. RF signals from the plate 254 pass through an inductor 256 that also preferably has an inductance of about 4.5 nH to a second input terminal of the balun 262. An inductor 258 that preferably has an inductance of about 12 nH is connected across the outputs of the two inductors 252 and 256. A grounded capacitor 260 is connected to the first input terminal of the balun 262, and a grounded capacitor 261 may be connected to the second input terminal of the balun 262.

The various reactive components of the circuitry together with the capacitance of the plates attached to the glass serve to generate a circuit having an essentially flat passband and low losses in the frequency range of about 900 to 1500 MHz.

Signals output from the balun 262 are applied to a junction 264 where a pair of resistors 266 and 268 are connected. The resistor 266 is grounded. The resistor 266 preferably has a resistance of about 82 Ω while the resistor 268 preferably has a resistance of about 43 Ω. These resistance's are chosen to match the output impedance of the circuitry to the 75 Ω impedance of the coaxial cable 8, which is connected to the resistor 268 through a capacitor 270 that preferably has a capacitance of about 100 pF.

Figure 5:
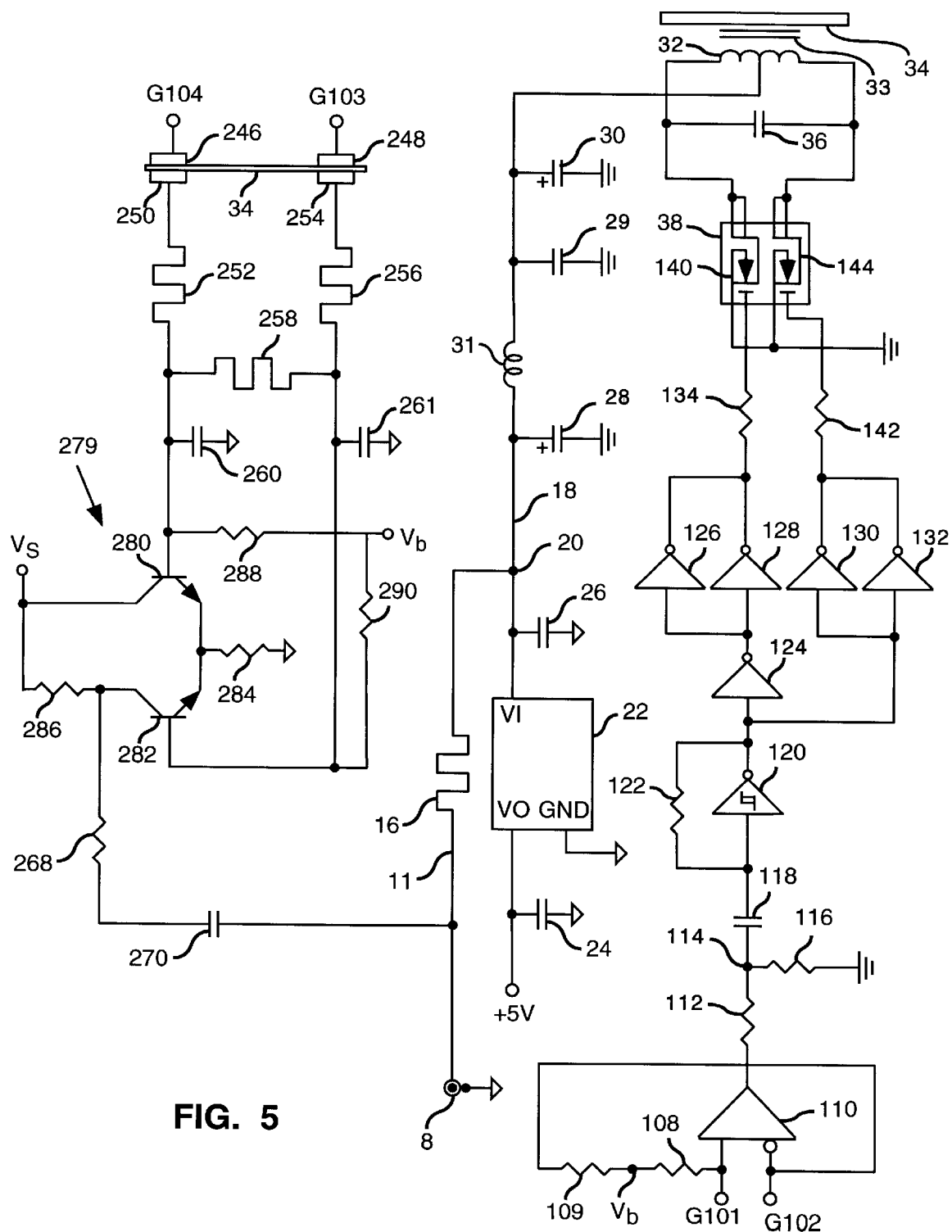
FIG. 5 is a schematic diagram of alternative circuitry for placement on the interior side of a window for transmitting electrical power to an external transmission line and for receiving video signals from the transmission line.

Referring to FIG. 5, the transformer 262 of FIG. 2 may be replaced by a differential amplifier 279 that includes a pair of transistors 280 and 282. The amplifier 279 is biased to operate in its linear region. One of the purposes of the amplifier 279 is to offset losses in the RF signal transmission path. These losses typically are about 21 dB and are mainly caused by the dielectric gap of the window 34.

The resistor 268 is connected to the collector of the transistor 282 and to a first terminal of a resistor 286. The other terminal of the resistor 286 is connected to a voltage source $V_S$, which is about +5 volts, and to the collector of the transistor 280. The resistor 286 is therefore connected between the collectors of the two transistors 280 and 282. The output of the amplifier 279 is taken off the collector of the transistor 282. The base of the transistor 280 is connected to the junction of the capacitor 260 and the inductors 252 and 258. The emitters of the transistors 280 and 282 are connected together and also connected to a first terminal of a resistor 284. The other terminal of the resistor 284 is grounded. The resistor 284 is a current source resistor and may be replaced by a constant current source. The base of the transistor 282 is connected to the junction of the capacitor 261, the inductor 258 and the inductor 256. A resistor 290 is connected between the bases of the two transistors 280 and 282. The remaining circuitry of FIG. 5 is identical to that of FIG. 2.

The differential feeding of the RF signal from the plates 250 and 254 to the amplifier 279 of FIG. 5 (or to the balun 262 of FIG. 2) provides the capability of transmitting a broadband RF signal with a single set of electrodes. Prior art circuitry for transmitting RF signals through a dielectric operate efficiently only at a single frequency and are inherently narrow-band.

Figure 6:
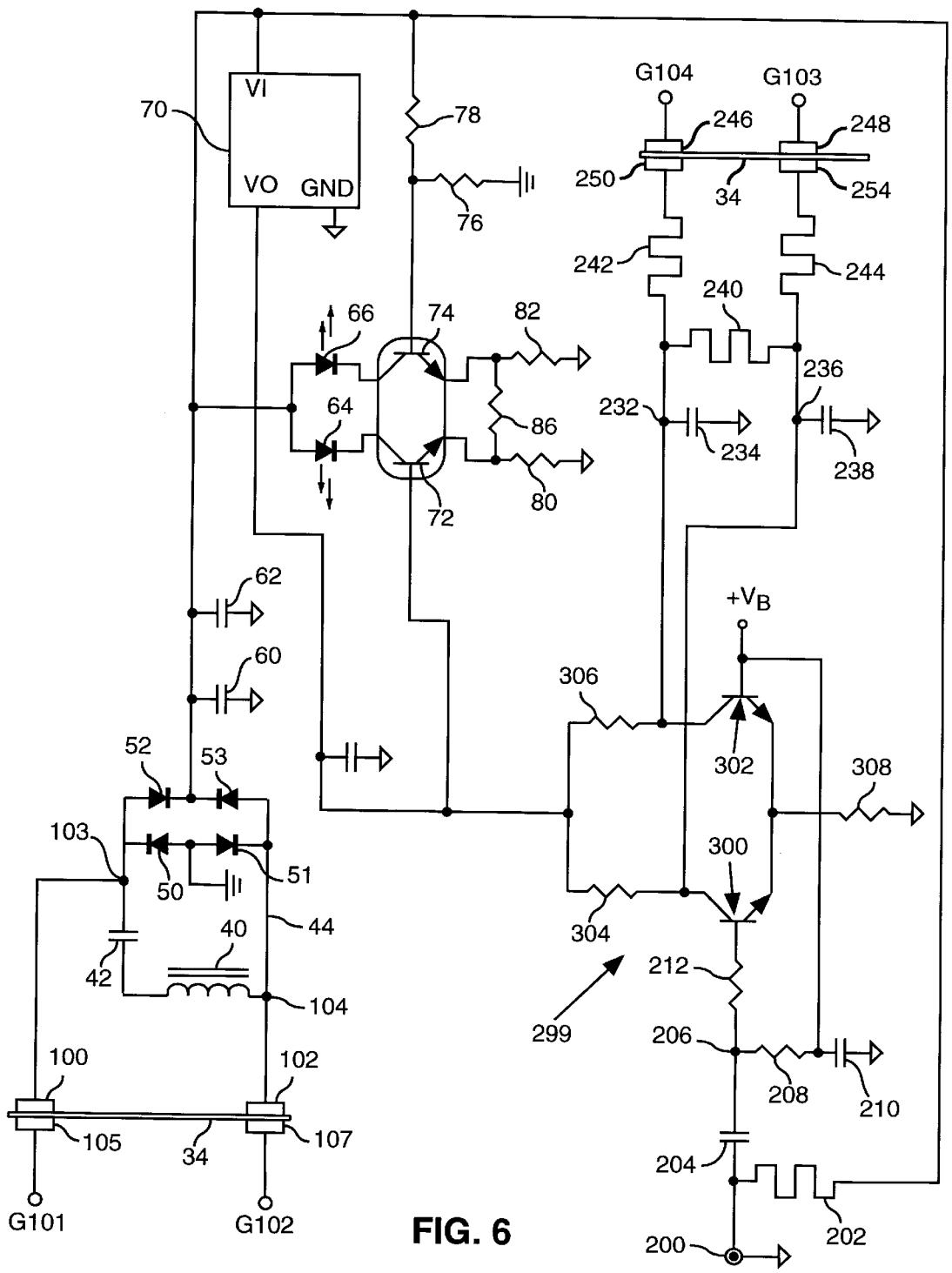
FIG. 6 is a schematic diagram of alternative circuitry for placement on the exterior side of a window for receiving electrical power for delivery to an external transmission line and for sending video signals from the transmission line to a receiver on the interior side of the window.

Referring to FIG. 6 the amplifier 98, the transformer 230 and the circuitry between them may be replaced by a differential amplifier 299 that includes a pair of transistors 300 and 302. The amplifier 299 is biased to operate in its linear region. One of the purposes of the amplifier 279 is to offset losses in the RF signal transmission path. The approximate 21 dB signal loss may be offset entirely by circuitry that includes one of the differential amplifiers 279 and 299. The circuitry may include both of the differential amplifiers 279 and 299 so that the gain necessary for offsetting the losses may be divided between the two amplifiers 279 and 299. Using both amplifiers 279 and 299 causes a decrease in the signal to noise ratio of the circuitry, but permits the use of less expensive transistors.

The base of the transistor 300 is connected to the resistor 212. The emitters of the transistors 300 and 302 are connected together and also connected to a first terminal of a resistor 308. The resistor 308 is a current source resistor and may be replaced by a constant current source. The other terminal of the resistor 308 is grounded. The collector of the transistor 300 is connected to a first terminal of a resistor 304. The other terminal of the resistor 304 is connected to the output VO of the voltage regulator 70. A resistor 306 is also connected to the VO output of the voltage regulator 70 and to the collector of the transistor 302. The output resistors 304 and 306 preferably have resistances of about 25 Ω so that the resistance between the collectors of the transistors 300 and 302 is 50 Ω. The collector of the transistor 300 is connected junction 236 of the capacitor 238 and the inductor 240. The collector of the transistor 302 is connected to the junction 232 of the capacitor 234 and the inductor 240.

Figure 7:
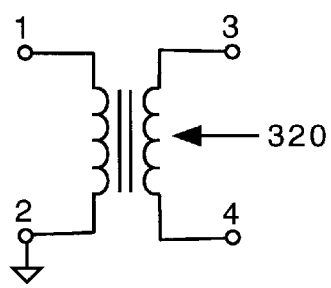
FIG. 7 illustrates an alternative arrangement of a transformer that may be included in the circuitry of FIGS. 2–6.

FIG. 7 illustrates an alternative transformer 320 that may be used instead of the transformer 262. For convenience, the terminals of the transformers 262 and 320 are labeled 1–4. The transformer 320 may be inserted instead of the transformer 262 by keeping the terminal numbering the same in the circuitry of FIG. 2. The differential signal is input across the terminals 3 and 4. The single ended output is taken at terminal 1 with terminal 2 of the transformer 320 being grounded. The transformer 320 may be similarly substituted for the transformer 230 of FIG. 3.

What is claimed is:

1. An interface circuit for connection between a first transmission line that is connected to a first electronic device on a first side of a dielectric layer and a second transmission line that is connected to a second electronic device on a second side of the dielectric layer, comprising:

a power transmission circuit connected to the first transmission line and arranged to be adjacent the first side of the dielectric layer, the power transmission circuit including:

a first reactive circuit connected to the first transmission line; and a converter circuit for converting DC electrical power from the first transmission line into AC electrical power at a conversion frequency and for inputting the AC electrical power into the first reactive circuit so that electrical power is transmitted across the dielectric layer via magnetic induction;

a power receiving circuit connected to the second transmission line and arranged to be adjacent the second side of the dielectric layer, the power receiving circuit including:

a second reactive circuit having resonant frequency in the power receiving circuit connected to the second transmission line; and a feedback circuit for maintaining the conversion frequency at the resonant frequency to achieve maximum power transfer from the first reactive circuit to the second reactive circuit, the feedback circuit including:

a first signal coupler connected to a first terminal of the second reactive circuit;

a second signal coupler connected to a second terminal of the second reactive circuit, the first and second signal couplers being arranged to couple signals indicative of the voltages at the first and second terminals of the second reactive circuit across the dielectric layer; and an amplifier connected to the first and second signal couplers, the first and second signal couplers being arranged to provide a differentially balanced drive to the amplifier such that the inputs to the amplifier are normally of equal magnitude and 180° out of phase, the amplifier being arranged to operate at the resonance frequency of the second reactive circuit and to provide a signal for driving the converter circuit at the resonant frequency.

2. The interface circuitry of claim 1, further including a start-up circuit connected to the converter circuitry for applying a signal thereto that operates the converter circuitry at a selected frequency in the absence of a feedback signal from the amplifier.

3. The interface circuitry of claim 2 wherein the start-up circuit is connected between the amplifier and the converter circuit and wherein application of the feedback signal from the amplifier to the start-up circuit phase locks the start-up circuit such that it outputs signals having the same frequency and phase as the feedback signal.

4. The interface circuitry of claim 1, further including an RF signal transmission circuit arranged to transmit the RF signals guided by the second transmission line across the dielectric layer to the first transmission line, the RF signal transmission circuit having an essentially flat frequency response over a selected frequency range, comprising:

a coupling apparatus coupled to the second transmission line to receive unbalanced broadband RF signals therefrom and produce a pair of differentially balanced feed signals; and an apparatus connected to the coupling apparatus to convert the differentially balanced feed into an unbalanced feed that is input to the first transmission line.

5. The interface circuitry of claim 4 wherein the apparatus connected to the coupling apparatus to convert the differentially balanced feed into an unbalanced feed that is input to the first transmission line comprises a balun.

6. The interface circuitry of claim 4 wherein the apparatus connected to the coupling apparatus to convert the differentially balanced feed into an unbalanced feed that is input to the first transmission line comprises a differential amplifier.

7. The interface circuitry of claim 4 wherein the coupling apparatus coupled to the second transmission line to receive broadband RF signals therefrom and produce a pair of differentially balanced feed signals comprises:

a differential amplifier connected to the second transmission line; and a pair of capacitors connected to the differential amplifier, the capacitors each having a first plate mounted to the first side of the dielectric layer and a second plate mounted to the second side of the dielectric layer to conduct RF signals from the second transmission line across the dielectric layer.

8. A method for forming an interface circuit for connection between a first transmission line that is connected to a first electronic device on a first side of a dielectric layer and a second transmission line that is connected to a second electronic device on a second side of the dielectric layer, comprising the steps of:

connecting a power transmission circuit to the first transmission line, the power transmission circuit being formed to include a converter circuit for converting DC electrical power from the first transmission line into AC electrical power at a conversion frequency and for inputting the AC electrical power into the first reactive circuit so that electrical power is transmitted across the dielectric layer via magnetic induction;

arranging the power transmission circuit to be adjacent the first side of the dielectric layer;

connecting a first reactive circuit in the power transmission circuit to the first transmission line;

connecting a power receiving circuit to the second transmission line;

connecting a second reactive circuit having a resonant frequency in the power receiving circuit to the second transmission line;

providing a feedback circuit for maintaining the conversion frequency at the resonant frequency to achieve maximum power transfer from the first reactive circuit to the second reactive circuit by a method that includes the steps of:

connecting a first signal coupler to a first terminal of the second reactive circuit;

connecting a second signal coupler to a second terminal of the second reactive circuit, the first and second signal couplers being arranged to couple signals indicative of the voltages at the first and second terminals of the second reactive circuit across the dielectric layer;

connecting an amplifier to the first and second signal couplers;

arranging the first and second signal couplers to provide a differentially balanced drive to the amplifier such that the inputs to the amplifier are normally of equal magnitude and 180° out of phase; and arranging the amplifier to operate at the resonance frequency of the second reactive circuit and to provide a signal for driving the converter circuit at the resonant frequency.

9. The method of claim 8, further including the step of connecting a start-up circuit to the converter circuit for applying a signal thereto that operates the converter circuitry at a selected frequency in the absence of a feedback signal from the amplifier.

10. The method of claim 9 including the steps of:

connecting the start-up circuit between the amplifier and the converter circuit; and applying the feedback signal from the amplifier to the start-up circuit phase to lock the start-up circuit such that it outputs signals having the same frequency and phase as the feedback signal.

11. The method of claim 8 further including the steps of:

arranging an RF signal transmission circuit to transmit the RF signals guided by the second transmission line across the dielectric layer to the first transmission line;

forming the RF signal transmission circuit to have an essentially flat frequency response over a selected frequency range;

connecting a coupling apparatus to the second transmission line to receive unbalanced broadband RF signals therefrom and produce a pair of differentially balanced feed signals; and connecting an apparatus to the coupling apparatus to convert the differentially balanced feed into an unbalanced feed that is input to the first transmission line.

12. The method of claim 11 wherein the step of connecting an apparatus to the coupling apparatus includes the step of connecting a balun to the coupling apparatus to convert the differentially balanced feed into an unbalanced feed that is input to the first transmission line.

13. The method of claim 11 wherein the step of connecting an apparatus to the coupling apparatus includes the step of connecting a differential amplifier to the coupling apparatus to convert the differentially balanced feed into an unbalanced feed that is input to the first transmission line.

14. The method of claim 11 wherein the coupling apparatus coupled to the second transmission line to receive broadband RF signals therefrom and produce a pair of differentially balanced feed signals is formed by a method that comprises the steps of:

connecting a differential amplifier to the second transmission line; and connecting a pair of capacitors to the differential amplifier; and arranging the capacitors such that each capacitor has a first plate mounted to the first side of the dielectric layer and a second plate mounted to the second side of the dielectric layer to conduct RF signals from the second transmission line across the dielectric layer.

15. An interface circuit for connection between a first electronic device located on a first side of a dielectric layer and a second electronic device located on a second side of the dielectric layer, comprising:

a power transmission circuit arranged to be adjacent the first side of the dielectric layer and connected to the first electronic device, the power transmission circuit including a converter circuit for converting DC electrical power from the first electronic device into AC electrical power at a conversion frequency and for transmitting it across the dielectric layer via magnetic induction;

a power receiving circuit arranged to be adjacent the second side of the dielectric layer, the power receiving circuit being arranged to receive the AC electrical power transmitted across the dielectric layer by the power transmission circuit, the power receiving circuit including apparatus for converting the AC electrical power into DC electrical power; the power receiving circuit being connected to the second electronic device to provide operating power thereto; and an RF signal transmission circuit connected to the second electronic device and arranged to transmit the RF signals from the second electronic device across the dielectric layer to the first electronic device.

16. The interface circuitry of claim 15 wherein the first electronic device comprises a television signal receiver and the second electronic device comprises a satellite antenna electronics system.

17. The interface circuit of claim 16, further including:

a first reactive circuit in the power transmission circuit connected to the television receiving circuit; and a second reactive circuit in the power receiving circuit connected to the satellite electronics.

18. The interface circuit of claim 17, wherein the converter circuit is connected to the first reactive circuit for inputting the AC electrical power thereto so that electrical power is transmitted across the dielectric layer via magnetic induction.

19. The interface circuit of claim 4 wherein the second reactive circuit has a resonant frequency, further including a feedback circuit for maintaining the conversion frequency at the resonant frequency to achieve maximum power transfer from the first reactive circuit to the second reactive circuit.

20. The interface circuitry of claim 19 wherein the feedback circuit includes:

a first signal coupler connected to a first terminal of the second reactive circuit;

a second signal coupler connected to a second terminal of the second reactive circuit, the first and second signal couplers being arranged to couple signals indicative of the voltages at the first and second terminals of the second reactive circuit across the dielectric layer; and an amplifier connected to the first and second signal couplers, the first and second signal couplers being arranged to provide a differentially balanced drive to the amplifier such that the inputs to the amplifier are normally of equal magnitude and 180° out of phase, the amplifier being arranged to operate at the resonance frequency of the second reactive circuit and to provide a signal for driving the converter circuit at the resonant frequency.

21. The interface circuitry of claim 20, further including a start-up circuit connected to the converter circuit for applying a signal thereto that operates the converter circuit at a selected frequency in the absence of a feedback signal from the amplifier.

22. The interface circuitry of claim 21 wherein the start-up circuit is connected between the amplifier and the converter circuit and wherein application of the feedback signal from the amplifier to the start-up circuit phase locks the start-up circuit such that it outputs signals having the same frequency and phase as the feedback signal.

23. The interface circuitry of claim 16, wherein the RF signal transmission circuit comprises:

a coupling apparatus coupled to the satellite electronics to receive unbalanced broadband RF signals therefrom and produce a pair of differentially balanced feed signals; and an apparatus connected to the coupling apparatus to convert the differentially balanced feed into an unbalanced feed that is input to the television signal receiver.

24. The interface circuitry of claim 23 wherein the apparatus connected to the coupling apparatus to convert the differentially balanced feed into an unbalanced feed that is input to the television signal receiver comprises a balun.

25. The interface circuitry of claim 23 wherein the apparatus connected to the coupling apparatus to convert the differentially balanced feed into an unbalanced feed that is input to the television signal receiver comprises a differential amplifier.

26. The interface circuitry of claim 23 wherein the coupling apparatus coupled to the satellite electronics system to receive broadband RF signals therefrom and produce a pair of differentially balanced feed signals comprises:

a differential amplifier connected to the satellite electronics system; and a pair of capacitors connected to the differential amplifier, the capacitors each having a first plate mounted to the first side of the dielectric layer and a second plate mounted to the second side of the dielectric layer to conduct RF signals from the satellite electronics system across the dielectric layer.

\* \* \* \* \*